June 3, 1941.   F. A. MAHANEY   2,244,494
GOVERNOR AND GENERATOR FOR WIND CHARGING DEVICES
Filed Aug. 5, 1937

INVENTOR.
Frank A. Mahaney
BY Sam J. Slotsky
ATTORNEY

Patented June 3, 1941

2,244,494

UNITED STATES PATENT OFFICE 2,244,494

GOVERNOR AND GENERATOR FOR WIND CHARGING DEVICES

Frank A. Mahaney, Sioux City, Iowa

Application August 5, 1937, Serial No. 157,577

1 Claim. (Cl. 188—185)

My invention relates to a wind charging device for charging batteries, etc.

An object of my invention is to provide a unit charging device which is compact and requiring a minimum of space for the voltage generated.

A further object of my invention is to provide governing means for governing the speed of rotation of the propeller blades so that an over voltage is not generated on the line.

A further object of my invention is to provide such governing means which can be completely enclosed and which is extremely simple in operation.

A further object of my invention is to provide the above mentioned objects in a construction which is positive in action and will constantly run without attention and which can be manufactured at a reasonable cost.

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1:
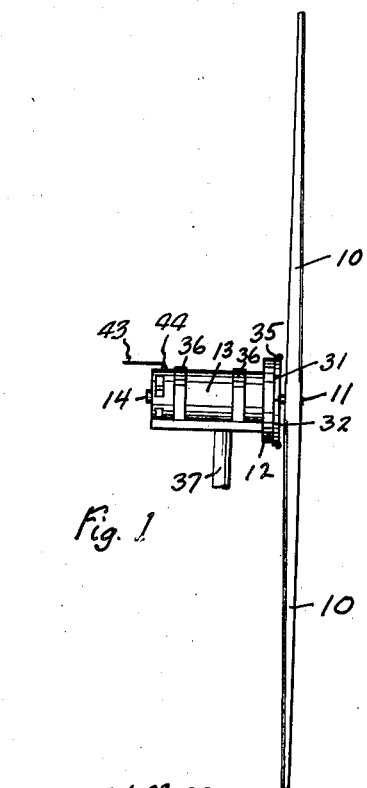
Figure 1 is a side elevation of my unit.

I have used the character 10 to indicate generally the propeller blade which is wind driven and which is of the usual construction. Attached to the blade 10 is the horizontal shaft 11, which extends through the governor housing 12 and the generator 13 and terminates at the enclosed portion 14. The housing 12 as shown is affixed at one end of the generator 13, and it can be an integral part thereof, and is situated directly behind the propeller 10.

A collar 15 is securely attached to the shaft 11 by means of the set screw 16. Threadably and rigidly attached to the collar 15 at 17 are the two plungers 18. The plungers 18 are merely round rods which are closely received within the cylindrical hollow members 19. The hollow members 19 merge directly with the arcuate portions 20 to which arcuate portions are attached suitable frictional material such as brake lining 21.

Attached to the cylindrical members 19 are the cross arms 22 which receive the pins 23 and at the opposite extremities thereof the threaded bolts 24. Threadably engaged with the bolts 24 are the nuts 25. Suitable tension springs 26 are attached as shown at the end of corresponding bolts 24 and pins 23.

It will be seen that the function of the springs 26 is to tensionally draw the braking surfaces 21 towards the shaft 11. However, as the rotational speed of the propeller 10 increases the centrifugal force imparted to the combined members 19, 20 and 21 tends to throw these members outwardly and the frictional surfaces 21 engage the inside of the housing 12, thereby setting up a correspondingly greater friction and slowing down the speed of the propeller. In this manner the speed is entirely governed so that it will not reach too high a rate, thereby causing overcharging. As soon as the speed of the propeller decreases, the braking members 21 will again separate from the inside of the member 12 and in this manner the speed of rotation is nicely governed.

Small openings 27 are provided at the upper end of the cylindrical members 19, the purpose of which is to eliminate vacuums formed in the cylindrical members due to the plunger action of the rods 18 since otherwise when returned from the higher position, a vacuum would be formed destroying the efficiency of the construction preventing the members from being thrown to the outer position. The pins 28 are secured to the rods 18, which pins are received within suitable lengthened slots 29. The purpose of this construction is to prevent rotational movement of the cylindrical member 19 about the rod 18 so that the braking members will travel in a uniform plane without any distortive effects. An adjustment of tension can be provided on the spring 26 by means of the nuts 25, and it will be noted that the threaded bolts 24 are located oppositely on the arms 22. The purpose of this construction is to equalize the adjustment so that as the members rotate normally in the direction of the arrow 30, there will not be binding at any two points on the same side of the vertical axis of the plungers, which would be true without this construction.

Figure 2:
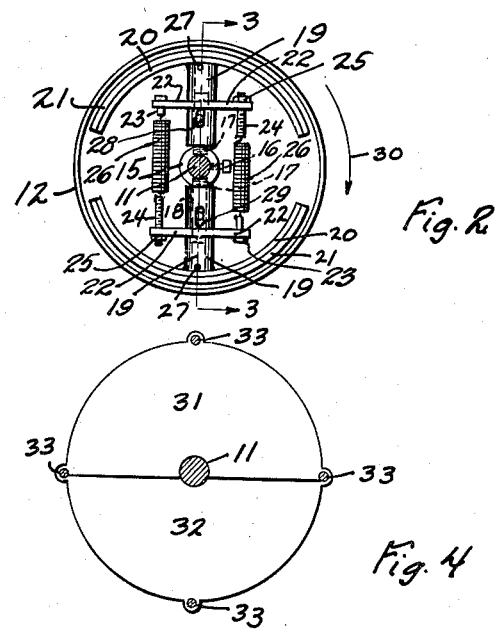
Figure 2 is a sectional view taken just in front of the governing members.
Figure 4:
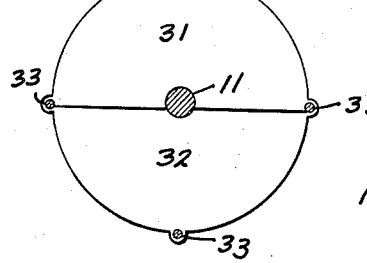
Figure 4 is a sectional view taken immediately behind the propeller and showing the governing means of the governor housing.

For instance if the adjustment were taken up only on the left hand side of the construction in Figure 2, the points of arcuate members would be spread outwardly on the right hand side, thereby resulting in this objectionable feature.

Figure 3:
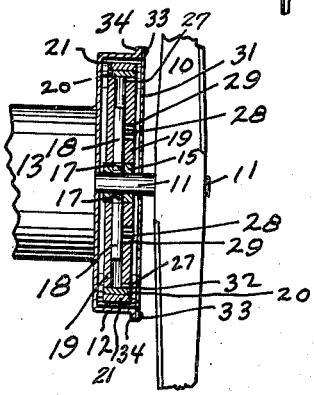
Figure 3 is a sectional view taken generally along the lines 3—3 of Figure 2.

The governor housing 12 is covered by means of the overlapping semi-circular members 31 and 32, which are secured by means of suitable machine screws 33 received within the ears 34 (see Fig. 3). The members 31 and 32 include annular integral flanges 35 which overlap the housing 12. The generator 13 is secured by means of straps 36 to the pivotal construction 37 in the usual manner.

It will now be seen that I have provided a composite unit, which includes positive acting governing characteristics which will limit the speed of the rotating blades, that the device is completely covered during operation, thereby eliminating the objectionable features of sleet, snow and other elements contacting with the governing parts, that I have provided such a device which functions efficiently under adverse conditions without the necessity of care, and which can be manufactured at a very reasonable cost.

Some changes may be made in the construction and arrangement of the parts of my invention without departing from the real spirit and purpose of my invention, and it is my intention to cover by my claim any modified forms of structure or use of mechanical equivalents, which may be reasonably included within their scope.

I claim as my invention:

A governing device for wind-driven propellers including an annular housing, braking means attached to the propeller shaft, means for causing said braking means to be thrown outwardly centrifugally as the shaft is rotated, said braking means frictionally contacting said annular housing to decrease the speed of rotation of said shaft, said braking means including a pair of opposed arcuate members including radially extending cylindrical members attached thereto, plungers attached to the shaft received within said cylindrical members, said cylindrical members having cross arms attached thereto, a pair of springs attached between said cross arms for normally holding said braking members against braking action, means for adjusting tension of said springs attached to and said cross arms, said adjusting means being attached at only diagonally opposite sides of said cross arms both vertically and laterally to provide non-binding adjustment to said braking surfaces.

FRANK A. MAHANEY.